July 28, 1964    H. M. LANG    3,142,499
ANCHOR AND FLUID SEAL FOR CONDUIT LINER
Filed Feb. 5, 1962    2 Sheets-Sheet 1

HAROLD M. LANG
INVENTOR.

BY *Arthur McElroy*

ATTORNEY.

HAROLD M. LANG
INVENTOR.

ated July 28, 1964

3,142,499
ANCHOR AND FLUID SEAL FOR CONDUIT LINER
Harold M. Lang, Tulsa, Okla., assignor to Pan American Petroleum Corporation, Tulsa, Okla., a corporation of Delaware
Filed Feb. 5, 1962, Ser. No. 171,217
4 Claims. (Cl. 285—55)

The present invention relates to the lining of pipe or similar conduits with a relatively thin-walled, flexible material. More particularly, it is concerned with a means by which sections of such lining can be anchored to the end of a pipe so that abutting ends of lining so anchored will form a fluid-tight seal.

The method contemplated for installing a flexible liner in a pipe or line is similar to that disclosed in U.S. 2,794,758. The procedure there described involves the in-place lining of a pipeline, or similar conduit, with a tubular plastic liner which is initially mounted on a reel. The free end of the liner is anchored to the end of the pipeline and then by fluid pressure exerted on the exterior of said liner at the anchored end thereof the liner is forced to pass through itself, i.e., is turned inside-out, and is paid off of the reel until half the length of the conduit is lined. At that point, the liner is severed at the supply reel, the free end of the liner is tied closed, and the remainder of the liner is then installed. When the liner is severed from the supply reel, the free end of the liner may be tied closed with a string which is then paid out from a string supply reel in order to provide a controlled tension to the liner as the last half of the conduit is lined. When the liner has reached the second end of the conduit and is anchored, the string is withdrawn from the lined conduit.

The difficulty frequently encountered when employing a pressured system in which the lining has been installed by the above patented method is that the liner ruptures as a result of cuts made by pressure of the liner against pipe coupling threads. In accordance with previous methods of anchoring and sealing the liner between sections of pipe, the transported fluid contacted the metal parts of the coupling owing to the lack of an effective seal between the anchored ends of the liner. Also, some bursting of the liners has been experienced in spaces of enlarged diameter between pipe ends at the coupled connections. A further contributing factor to this difficulty is the sharp ends of the pipe at the coupled joints which tend to cut the liner when the system is placed under pressure. Of course, a leak of any kind in the flexible liner allows the transported fluid to flow between the liner and the pipe resulting in failure of the entire installation.

In employing my invention, the liner which, for example, may be a thin-walled plastic such as polyethylene, a vinylchloride-vinylidenechloride copolymer, etc., is anchored to a fitting which is, in turn, affixed to the pipeline. As a matter of fact, the fitting may be employed as a union connecting two sections of pipe. This is somewhat in contrast to previous practice which attempted to secure the liner into the end of a long string of pipe. In this invention, generally the same kind of fitting is used as would normally be required when a heavier-walled plastic liner is placed in a pipeline. Experience has shown that it is usually desirable to install the lining, for example in a two-inch line, in continuous lengths of 1,200 to 1,500 feet. Because of this the pipeline needs to be opened at the end of the liner section, the liner properly anchored to the end of the pipe, a second section of liner installed in the pipe downstream, and the pipeline recoupled where the abutting liner ends have been anchored. In the case of a threaded and coupled pipe, the coupling is ordinarily accomplished by means of a threaded-type union. Other couplings, such as a threaded or welded flange fitting, may be used.

Figure 1:
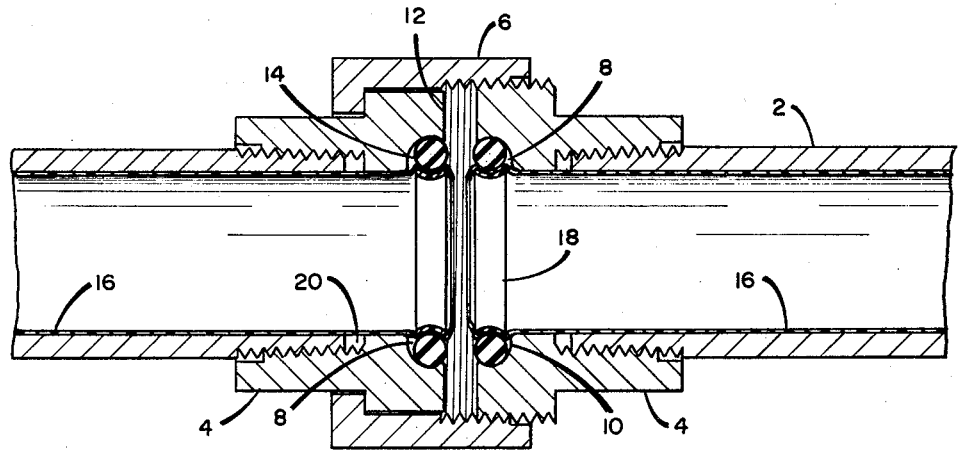
FIGURE 1 is a fragmentary sectional view illustrating one embodiment of my novel lining anchor in which the abutted ends of the liner have not yet been placed in fluid-tight engagement.

In FIGURE 1, sections of pipe 2 are joined by a union 4 having a threaded clamping ring 6. In this view the joint is only partially closed. This union may be built from a conventional railroad union by milling off the cone and seat forming grooves 8. An annular recess 10 is formed by abutting faces 12 of union 4. The width of recess 8 is controlled by movement of faces 12 axially of pipe 2. Recess 10 holds resilient rings 14 with a single ring in each of the grooves forming the recess. These rings may be made of rubber or any plastic having the desired degree of resiliency and stability. Sealing members, commonly referred to as O-rings, are a type that can be employed to advantage.

Plastic liner sections 16 installed in pipe 2 are secured at their ends by clamping the latter between rings 14 and backing rings 18 which fit snugly inside rings 14. The backing rings may be of nylon, stainless steel, or other materials having similar mechanical and chemical properties, the principal requirements being that such material is inert to the fluid flowing through the line. The rings formed therefrom should be relatively hard and firm. The latter characteristic is usually considered desirable in order to guarantee a fluid-tight seal in the line at high pressures. Thus a tighter seal is effected in this system by bringing the faces of union 4 closer together which, in turn, results in rings 14 pressing down on substantially inflexible backing rings 18 to form a seal with plastic liner 16 that is essentially self-energizing.

In addition to the materials mentioned above, the liner employed in carrying out my invention may be manufactured from a number of commercially available plastics or equivalent materials; for example, polyesters such as those prepared from terephthalic acid and ethylene glycol, polyethylene-polypropylene copolymers, etc. The film thickness of these liners may vary widely, it generally being desirable that they are sufficiently thin to be flexible so as to permit installation by the method described herein. In the majority of cases, film thickness of the order of about 1 to 5 mils is usually adequate. It should be understood, however, that the anchoring means disclosed herein can be used in conjunction with heavier-walled liners inserted into a pipeline by methods other than that described in U.S. 2,794,758, referred to above.

As a precaution against possible cutting or rupturing of the liner at high pressures, annular slot or cavity 20 may be packed with a heavy grease or equivalent material, as described and claimed in copending application U.S. 152,386, of Jennings et al., filed April 11, 1961.

Figure 2:
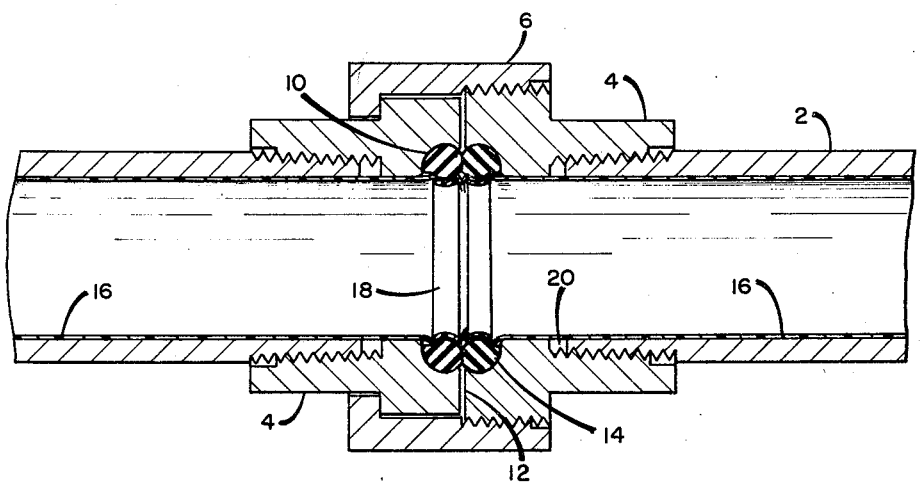
FIGURE 2 is also a fragmentary sectional view of the anchoring device in which the liner ends have been placed in fluid-tight relationship.
Figure 3:
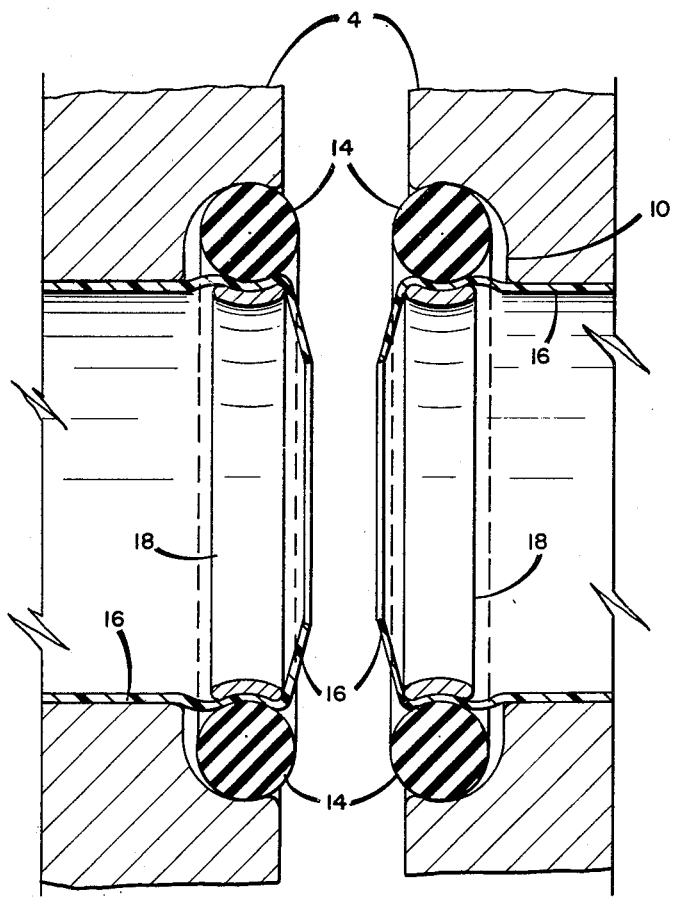
FIGURE 3 is an enlarged fragmentary sectional view of the means by which the flexible liner is anchored and formed into a fluid-tight seal.

In FIGURE 2, the separate halves of union 4 are drawn together by means of clamping ring 6 so as to make recess 10 smaller in width. Actually, rings 14 deform to some extent under the pressure exerted on them and in this way the ends of liner 16 between backing rings 18 and sealing rings 14 are held securely in place. Clamping ring 6 is used to increase the sealing force or pressure between rings 14 and to maintain such pressure.

In assembling the liner and sealing anchor in accordance with my invention, plastic liner 16 is inserted in a section of pipe 2, preferably in accordance with the procedure described in U.S. 2,794,758. One half of union 4 is screwed on to the threaded end of pipe 2 after which a sealing ring 14 is forced or snapped into groove 8. The end of tubular liner 16 is then pulled out so that it extends slightly beyond ring 14. A backing ring 18 is next slipped inside tubular liner 16 and then forced into ring 14, as shown, so as to hold the end of liner 16 firmly in place. Similar steps are taken with respect to the other section of pipe 2 to be joined. The fluid-tight seal between rings 14 is then formed by adjusting the halves of union 4 so that they bring rings 14 in close contact with one another. Union faces 12 may then be brought even closer to one another and locked in this position by means of clamping ring 6. One advantage of an arrangement of this sort is that the upstream projecting end of liner 16, with the flow of a fluid therethrough, tends to bridge across the juncture of rings 14 to form a smoother surface and reduce turbulence.

The use of thin-walled liners as contemplated by my invention is not only applicable in lines transporting gaseous or liquid hydrocarbons but may be employed to equal advantage in preventing corrosion of the metal line by acid solutions, oil field brines, etc. The anchor and seal provided by this invention also afford protection of the couplings which, in the past, have been left in open contact with the fluids flowing through lined pipe. It should also be pointed out that because contamination of the fluid can be held to a minimum in a pipeline in which the liner therein is anchored in accordance with my invention, it is entirely feasible to transport raw food materials and food products through such lines. The parts of the coupling and seal can be readily and effectively sterilized periodically and the liner replaced with a clean one at little expense.

While a preferred embodiment of the invention has been shown in the drawings and particularly described, it will be understood that the specific construction can be modified without departing from the scope of the invention as disclosed herein.

I claim:

1. A joint for lined pipe sections comprising separate coupling members surrounding adjacent end portions of said sections, means connecting said separate coupling members to said adjacent sections, an annular recess in each of said coupling members defined by opposing radially inwardly and axially outwardly opening coaxial counterbores formed in the opposing end portions of each of said members, means for independently adjusting said coupling members on said sections to thereby vary the axial spacing between said recesses by regulating the distance between said separate coupling members, resilient seal means disposed within each of said counterbores, the combined axial extent of said opposing seal means being greater than the sum of the maximum axial extent of said recesses, a thin-walled, flexible, non-metallic liner in each of said sections, the adjacent end portions of said liner extending beyond the respective ends of said sections to a position radially inwardly opposed to said seal means, a backing ring having a greater external diameter than the normal internal diameter of said seal means disposed within the end portion of said liner at a point radially opposite said seal means and forcing said liner into fluid-tight engagement with said seal means, and means for locking said coupling members in opposed relationship with said seal means in fluid-tight axial abutment.

2. A joint for lined pipe sections comprising separate coupling members surrounding adjacent end portions of said sections, means connecting said separate coupling members to said adjacent sections, an annular recess in each of said coupling members defined by opposing radially inwardly and axially outwardly opening coaxial counterbores formed in the opposing end portions of each of said members, means for independently adjusting said coupling members on said sections to thereby vary the axial spacing between said recesses by regulating the distance between said separate coupling members, resilient seal means disposed within each of said counterbores, the combined axial extent of said opposing seal means being greater than the sum of the maximum axial extent of said recesses, a thin-walled, flexible, non-metallic liner in each of said sections, the adjacent end portions of said liner extending beyond the respective ends of said sections to a position radially inwardly opposed to said seal means, a backing ring having a greater external diameter than the normal internal diameter of said seal means disposed within the end portion of each of said sections at a point radially opposite said seal means and forcing said liner into fluid-tight engagement with said seal means, and means for locking said coupling members in opposed relationship with said seal means in fluid-tight axial abutment.

3. The joint of claim 2 in which a plastic liner is employed.

4. An anchor for joining together two sections of thin-walled, flexible, conduit liner having in combination axially opposed adjustable coupling members, an annular recess in each of said members defined by opposing radially inwardly and axially outwardly opening co-axial counterbores formed in the opposing end portions of each of said members, resilient seal means disposed within each of said counterbores, the combined axial extent of said opposing seal means being greater than the sum of the maximum axial extent of said recesses, the adjacent end portions of said sections being radially disposed within said seal means, a backing ring having a greater external diameter than the normal internal diameter of said seal means disposed within the end portion of each of said sections at a point radially opposite said seal means and forcing said liner into fluid-tight engagement with said seal means, and means for locking said coupling members in opposed relationship with said seal means in fluid-tight axial abutment.

References Cited in the file of this patent

UNITED STATES PATENTS

| | | |
|---|---|---|
| 1,071,235 | Hutton | Aug. 26, 1913 |
| 2,070,291 | McHugh | Feb. 9, 1937 |
| 2,419,702 | Barnes | Apr. 29, 1947 |
| 2,616,729 | Hansen | Nov. 4, 1952 |
| 2,971,532 | McLaren | Feb. 14, 1961 |

FOREIGN PATENTS

| | | |
|---|---|---|
| 25,540 | Australia | July 22, 1936 |
| 526,147 | Belgium | Aug. 2, 1954 |